United States Patent [19]

Squyres

[11] Patent Number: 5,143,455

[45] Date of Patent: Sep. 1, 1992

[54] BEARING SLEEVE WITH NOTCHED END

[76] Inventor: Richard T. Squyres, P.O. Drawer AA, Ingleside, Tex. 78362

[21] Appl. No.: 659,728

[22] Filed: Feb. 25, 1991

[51] Int. Cl.$^5$ .............................................. F16C 3/00
[52] U.S. Cl. ....................................... 384/97; 384/98
[58] Field of Search ............... 384/91, 97, 98, 125, 384/220, 222, 280, 281, 289–291, 295–297, 315, 906

[56] References Cited

U.S. PATENT DOCUMENTS

| 1,797,223 | 3/1931 | Annis | 384/97 |
|---|---|---|---|
| 2,004,506 | 6/1935 | Moffitt | 384/291 |
| 2,203,039 | 6/1940 | Aker | 384/97 |
| 2,348,274 | 5/1944 | Aker | 384/97 |
| 2,348,275 | 5/1944 | Aker | 384/97 |
| 2,380,715 | 7/1945 | Aker | 384/98 |
| 2,405,799 | 8/1946 | Smeallie | 384/97 |
| 2,538,921 | 1/1951 | Smeallie | 384/97 |
| 3,317,254 | 5/1967 | Satterthwaite et al. | 384/97 |

Primary Examiner—Thomas R. Hannon
Attorney, Agent, or Firm—G. Turner Moller

[57] ABSTRACT

A bearing includes an annular rubber member having a metal sleeve bonded in the inside diameter. In one embodiment, the metal sleeve and shaft associated with the bearing provide a keyway having a key therein mounting the bearing for rotation with the shaft and limiting axial movement of the bearing relative to the shaft. The rubber member rotates relative to a metal sleeve or housing. The bearing can be removed and replaced from one end of the shaft-bearing structure so the bearing can be replaced without pulling the shaft from its surrounding housing. In another embodiment, a series of interfitting lugs and slots rotate the bearing with the shaft.

13 Claims, 2 Drawing Sheets

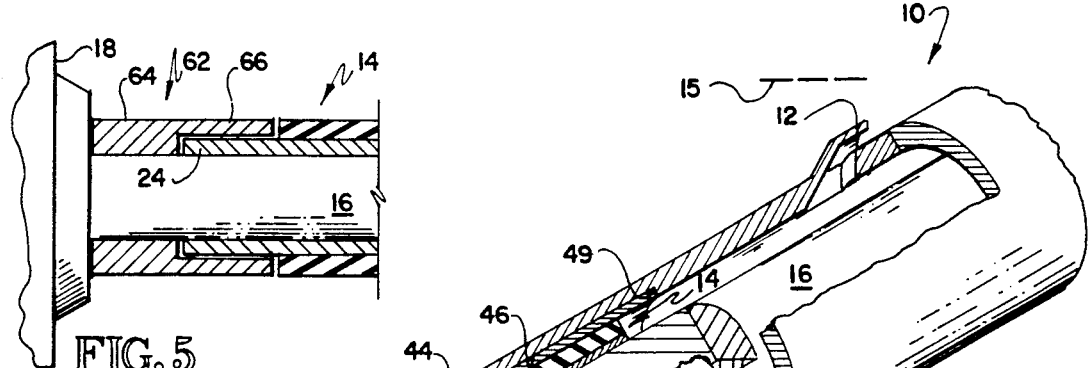
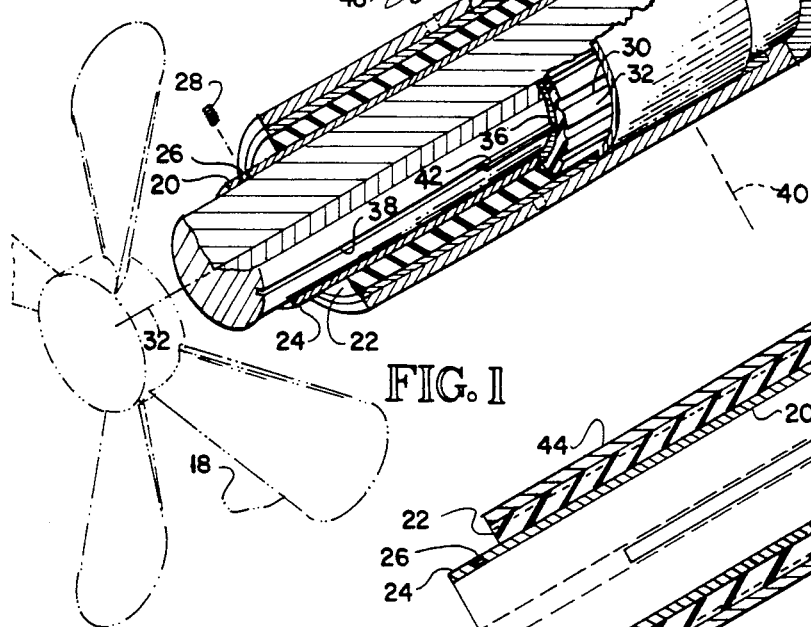
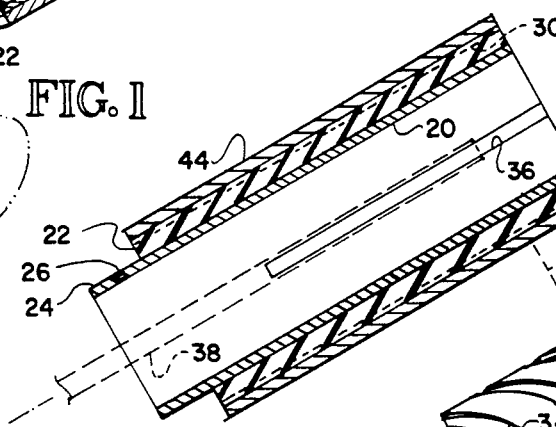
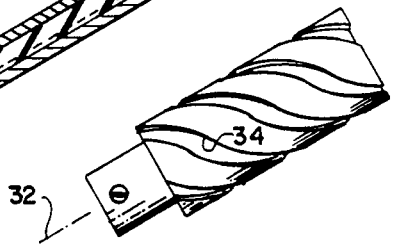
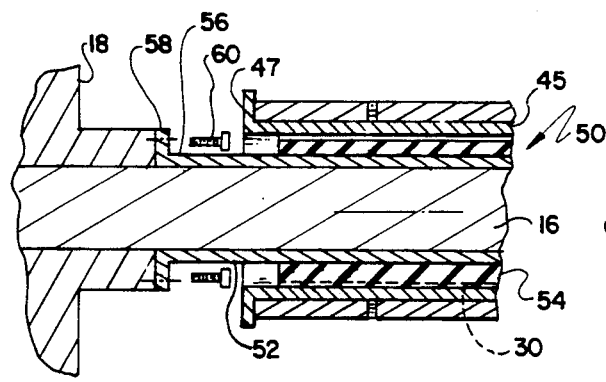
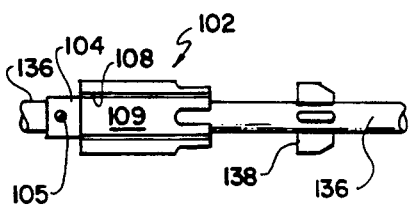

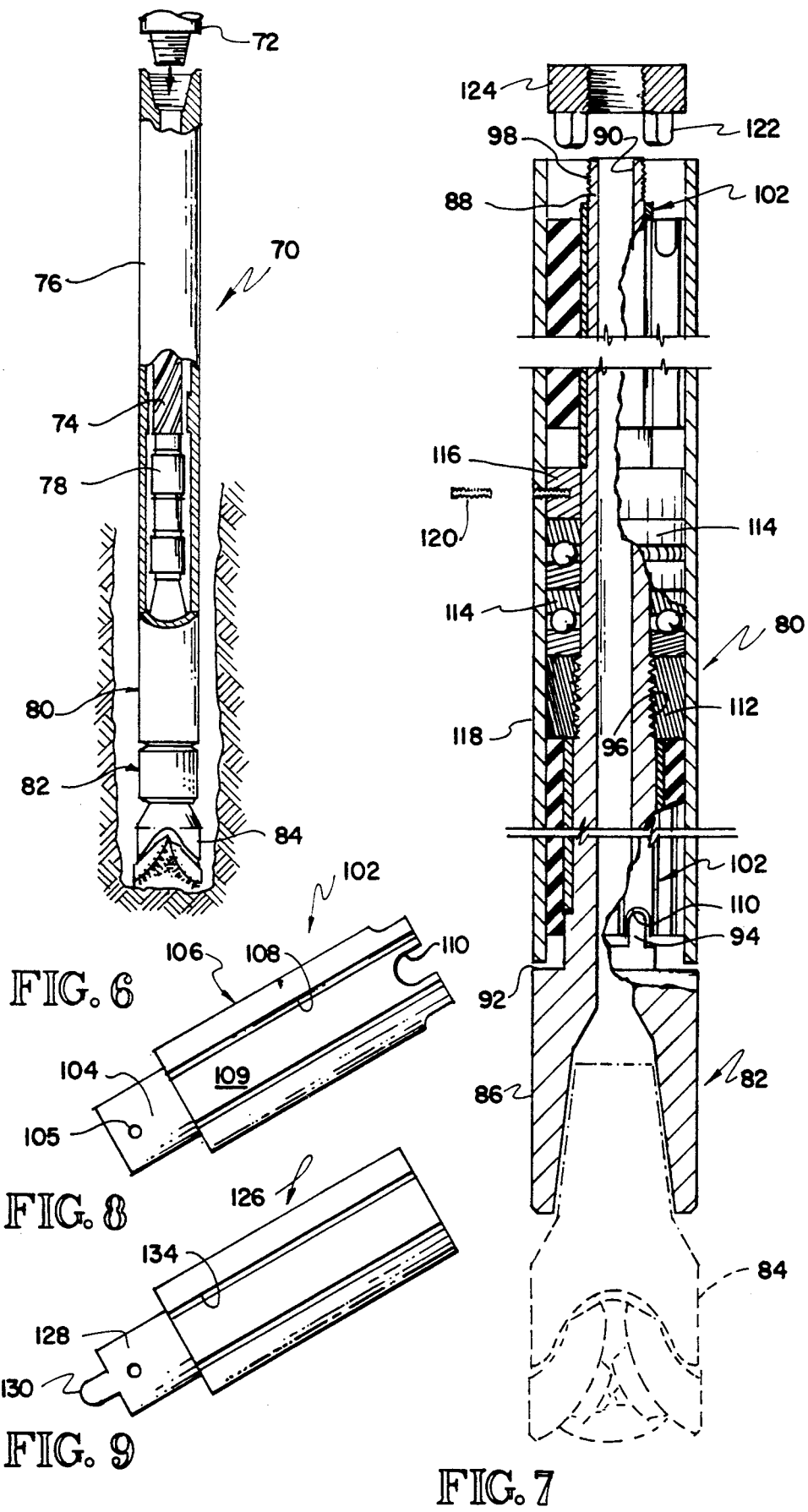

BEARING SLEEVE WITH NOTCHED END

This invention relates to an improved bearing and the method of installing the same.

Cutlass bearings have been the standard of use in several applications, some of which are marine and some of which are not. The typical marine application is journalling the propeller shaft of a fairly large boat or ship for rotation inside a stern tube. A typical non-marine application is journalling the driven shaft of a mud motor used to drill deviated or horizontal wells in the oil field.

A standard Cutlass bearing is a relatively long annular rubber member rotatably receiving a shaft through an opening in the center. The rubber member typically has slots or grooves on the interior surface to allow water to pass axially through the bearing to cool and lubricate it. The bearing typically includes a cylindrical metal sleeve secured in some fashion to the stern tube. The rubber member is typically bonded to the metal sleeve. Cutlass bearings have been used for decades in marine applications and have been used in mud motors for about as long as mud motors have been in existence.

In retrospect, Cutlass bearings have several major defects. First, the shaft rotates relative to the interior rubber surface of the bearing. Thus, shaft rotation occurs at the location where the area between the rotating parts is at its smallest. Second, there is always some shaft wear even though the bearing material is much softer than the shaft material. Thus, the shaft has to be periodically built up, typically by welding metal on the shaft and then dressed or machined to the desired size. Third, removal and replacement of a standard Cutlass bearing is a time consuming and difficult chore because the shaft has to be removed from its surrounding housing. Fourth, wear on the rubber sleeve is uneven and is concentrated at the bottom because the sleeve is stationary. Thus, the passage through the rubber sleeve often wears into an egg shaped opening. Oddly, the shaft sometimes wears into an egg shaped cross-section also. In a propeller drive shaft application, the drive shaft has to be removed from the stern tube. Replacing the drive shaft bearing in a fairly large boat is no small task and, when the shaft has to be built up and machined, can take several days from start to finish. In a mud motor, the drive shaft has to be removed from the motor housing. Although drive shaft bearings are easier to replace in mud motors because they are smaller and easier to handle, it is still a chore. Because the drive shaft has to be removed from its housing, this means repair costs are excessive for two reasons: (1) an undue amount of labor expense is required to change the bearing and (2) the equipment is out of service and not providing income for the period of the delay.

The bearing of this invention differs from the standard Cutlass bearing in several ways. First, the rubber sleeve is attached to the shaft so it rotates with the shaft rather than relative to the shaft. This means the rubber sleeve rotates relative to a sleeve or housing member so the outer periphery of the sleeve, rather than the inner periphery, is the bearing surface. Because the outer periphery is inherently larger, the bearing necessarily lasts longer. Because rotation is relative to the surrounding sleeve rather than the drive shaft, rotational wear on the bearing is spread around the periphery of the rubber material and wear on the metal part is on the removable sleeve rather than the massive shaft. The sleeve is inherently easy to remove and replace, compared to the shaft.

Bearings of this general type have been proposed in the prior art as shown in U.S. Pat. Nos. 2,203,039; 2,348,274; 2,348,275; 2,380,715; 2,405,799 and 2,538,921. Analysis of these devices shows they are defective in several respects. Most prominently, these bearings are attached to the drive shaft in such a way that the shaft has to be removed from the device in order to replace the bearing. Thus, in a major respect, the bearings of these patents are no improvement on standard Cutlass bearings. In addition, most of these bearings are designed with small intricate passages through the bearing and/or the sleeve surrounding the bearing. Thus, these bearings of the prior art do not move nearly as large a quantity of liquid through bearing as the device of the present invention. Moving a large amount of liquid through the bearing not only cools and lubricates it, but also flushes sand or other granular particles out of the bearing, particularly when any particle is conveyed to the upper or non-load bearing part of the bearing, as the bearing turns.

In this invention, the rubber sleeve is bonded to an internal metal sleeve. The internal metal sleeve is slipped over the shaft and inside a bearing tube or sleeve that the rubber sleeve rotates relative to. The internal metal sleeve is removably attached to the drive shaft in a simple, convenient manner.

In accordance with one embodiment of this invention, the internal metal sleeve to which the rubber is bonded is attached to the drive shaft using a keyway provided in the shaft and metal sleeve and a removable key. The key not only locks the bearing to the shaft for rotation therewith but also limits axial movement of the bearing relative to the shaft. Because the key is inserted from the output end of the shaft, the shaft does not have to be removed from the stern tube or housing in order to replace the bearing.

In another embodiment of the invention, the internal metal sleeve to which the rubber is bonded is attached to the drive shaft by a series of lugs on the drive shaft meshing with notches in the end of the internal metal sleeve. The coaction of the lugs and notches axially positions the bearing on the shaft and also transmits shaft rotation into bearing rotation.

In another embodiment, the internal, metal sleeve connects to the drive shaft by axially extending lugs on the sleeve coacting with notches on some part of the rotating shaft.

Another aspect of this invention comprises the ability to remove and replace the bearing of this invention in a propeller shaft assembly without removing the propeller shaft from the stern tube.

One object of this invention is to provide an improved bearing comprising a replacement for a conventional Cutlass type bearing.

Another object of this invention is to provide an improved bearing and technique for replacing it without removing the shaft which is journalled by the bearing.

A further object of this invention is to provide a bearing comprising a metal sleeve with rubber bonded thereto having an improved technique for affixing a metal sleeve to the journalled shaft.

These and other objects of this invention will become more fully apparent as this description proceeds, reference being made to the accompanying drawing and appended claims.

IN THE DRAWINGS:

FIG. 1 is an isometric view of one embodiment of the bearing of this invention illustrated inside a boat stern tube;

FIG. 2 is a view of the bearing sleeve of FIG. 1 illustrating the keyway therein;

FIG. 3 is a view illustrating another bearing of this invention;

FIG. 4 is a view illustrating another bearing of this invention;

FIG. 5 is a view illustrating another technique of spacing a bearing of this invention from the propeller;

FIG. 6 is a view of a mud motor;

FIG. 7 is a view, mainly in cross-section, illustrating a bearing of this invention in a the mud motor of FIG. 6;

FIG. 8 is a side view of a bearing used in the mud motor of FIGS. 6 and 7;

FIG. 9 is a side view of another bearing usable in the mud motor of FIGS. 6 and 7; and FIG. 10 is a side view of the bearing of FIG. 6 used in a marine application.

Referring to FIGS. 1 and 2, there is illustrated a conventional stern tube 10 of a boat having one or more water scoops 12 arranged to direct water through the stern tube 10 in response to forward movement of the boat through the water in order to cool and lubricate a bearing 14. The forward end of the stern tube 10 is inaccessible from the rear of the boat because of a boat hull 15. The propeller shaft 16 extends through the stern tube 10 beyond the stern of the boat and connects to a propeller 18 in a more-or-less conventional manner.

The bearing 14 comprises a rigid sleeve 20 having an ID slightly larger than the OD of the propeller shaft 16 to snugly fit the propeller shaft 16. In most applications, the rigid sleeve 20 is metal and typically is of stainless steel to resist corrosion in a marine environment. A sleeve 22 of rubber like bearing material is bonded to the rigid sleeve 20. The rubber like material is of a conventional type and varies in hardness from one application to another, usually from about 65-90 Durometer. Preferably, the rubber sleeve 22 is somewhat shorter than the rigid sleeve 22 to provide an aft end 24 extending beyond the end of the rubber sleeve 22 and stern tube 10 as shown best in FIG. 1 for purposes more fully explained hereinafter. One or more threaded openings 26, having Allen screws 28 therein, are provided in the aft end 24 of the rigid sleeve 20 to act as a puller accessory as will be apparent.

After the material of the rubber sleeve 20 cures or hardens, a plurality of axially extending grooves 30 are conventionally machined in the external surface of the sleeve 20 leaving raised lands 32 between adjacent grooves 30. As will be appreciated, the lands 32 provide the bearing surface between the bearing 14 and the stern tube 10 while water passes through the grooves 30 to cool and lubricate the bearing 14 and flush any granular particles, such as sand or silt, out of the bearing 14. As shown in FIGS. 1-2, the grooves 30 are straight, but may be inclined to an axis 32 of the bearing 14 in a helical path as shown by the grooves 34 in FIG. 3 for purposes more fully explained hereinafter.

An important feature of the grooves 30, 34 is they extend completely to the end of the rubber sleeve 20 and are rather large thus provide a more-or-less straight through liquid path across the rubber sleeve 20. Because the bearing 14 rotates with the shaft 16, the edges of the grooves 30, 34 act much like pump impellers to move liquid relative to the surrounding sleeve and thus tend to keep a film of water between the rubber sleeve 20 and the surrounding sleeve. A piece of grit trapped at 6 o'clock between the bottom of the rubber sleeve 20 and its surrounding sleeve is quickly rotated to 12 o'clock out of a loaded position where water passing through the bearing 14 can flush it out.

The bearing 14 is connected to the propeller shaft 16 for rotation therewith. To this end, a keyway 36 extends, on the inside of the rigid sleeve 20, axially from the forward end of the sleeve 20 to terminate at a location spaced from the aft end 24. A similar keyway 38 extends from a location outboard of the stern tube 10 along the exterior of the propeller shaft 16 and terminates in a plane 40, as will be explained more fully hereinafter. A key 42 extends through the ga provided by the aligned keyways 36, 38 and thereby connects the bearing 14 to the propeller shaft 16 for rotation.

Because the keyway 38 stops at the plane 40 and does not extend completely through the bearing 14, the key 42 cannot slide further inward than provided by the keyway 38. Because the keyway 36 stops before reaching the aft end 24 of the sleeve 20, the keyways 36, 38 overlap as shown best in FIG. 2 so the sleeve 20 cannot slide forwardly further than the end of the key 42. Thus, the keyways 36, 38 and key 42 provide an axial limit of movement of the bearing 14 toward the forward end of the stern tube 10. An axial limit of movement of the bearing 14 away from the stern tube 10 is provided by the propeller 18 when it is attached to the shaft 16 in a customary manner.

Removal of the bearing 14 from the stern tube 10 without pulling the propeller shaft 16 should now be apparent. The propeller 18 is removed from the shaft 16 to expose the aft end 24 of the sleeve 20. The Allen screws 28 are removed from the threaded openings 26 and a wheel puller rim (not shown) is attached to the threaded openings 26. The wheel puller screw (not shown) is positioned to react against the end of the propeller shaft 16 thereby pulling the wheel puller rim (not shown) and sleeve 20 to the left in FIG. 1. By the time the aft end 24 of the sleeve 20 clears the shaft 16, the bearing 14 is either freely moveable on the shaft 16 or another force applier can be attached to the sleeve 20. Pulling the sleeve 20 to the left causes the key 42 to bottom out in the groove 36 so the key 42 is also pulled out of the keyway 38.

After cleaning the exterior of the shaft 16 and the key way 38, a new bearing 14 is installed without pulling the shaft 16 from the stern tube 10 in a more-or-less reverse manner. The new bearing 14 may be warmed somewhat, depending on the composition of the rubber like sleeve 22, to make it thermally expand slightly to slide easily over the shaft 16. A new key 42 is placed in the keyway 36 of the sleeve 20 and the key 42 inserted into the propeller keyway 38. The new bearing 14 and key 42 are then slid to the right as viewed in FIG. 1. Large pliers (not shown) may be extended through the openings 26 to provide something to tap a hammer against until the key 42 bottoms out in the propeller keyway 38. The Allen screws 28 are then inserted into the threaded openings 26 and the propeller 18 reattached to the shaft 16. It will accordingly be seen that removal and installation of the bearing 14 can be done without removing the propeller shaft 16 from the stern tube 10 In retrofitting an existing boat, the propeller shaft needs to be pulled the first time to machine the keyway 38 therein.

In use, the propeller shaft 16 is turned by the boat engine (not shown) so the bearing 14 rotates inside the stern tube 10. As the boat moves forwardly in the water, water enters the scoop or scoops 12, passes axially through the inside of the stern tube 10 until reaching the bearing 14. The water then passes through the grooves 30 and over the lands 32 as the bearing 14 rotates with the shaft 16 thereby lubricating the bearing surface between the lands 32 and the interior of the stern tube 10.

Preferably, the interior of the stern tube 10 includes an easily replaceable bearing wear tube 44 of any suitable material, such as hardened stainless steel or chromoloy. The wear tube 44 is located in a recess 46 adjacent the aft end of the stern tube 10. The bearing tube 44 is affixed to the stern tube 10 in any suitable fashion, as by set screws 48. The bearing tube 44 is preferably somewhat longer than the rubber sleeve 22 to accommodate slight axial slippage of the bearing 14. The bearing tube 44 abuts against a shoulder 49. It will be seen that an old bearing tube 44 can be easily removed from the stern tube 10 after the bearing 14 is removed and the propeller 18 is off the shaft 16. It will accordingly be seen that any wear on the metal parts of the bearing assembly of this invention occur on the bearing wear tube 44, which is easily made and replaced, rather than on the shaft 16 which is not easily replaced or easily repairable.

FIG. 4 illustrates a bearing 50 comprising another embodiment of this invention cooperating with a wear sleeve 45 having a flange 47 on the rearward end projecting beyond the propeller tube. The flange 47 may thus be grasped by a wheel puller so the wear sleeve 45 can be removed without removing the propeller shaft 16. The bearing 50 includes a rigid sleeve 52 having the rubber like bearing sleeve 54 bonded thereto and a bracket 56 extending rearwardly from the rigid sleeve 52 toward the propeller 18. The bracket 56 provides a radially extending flange 58 adjacent the propeller 18. Fasteners 60, such as screws, attach the bracket 56 to the propeller 18. Thus, the connection between the bearing 50 and the propeller 18 causes the bearing 50 to rotate with the propeller shaft 16 and axially fixes the bearing 50 relative to the propeller shaft 16. Thus, the fasteners 60 replace the key and keyway of FIGS. 1-2. One advantage of the bearing 50 is that the propeller shaft 16 does not have to be pulled to machine the keyway 38 when initially modifying a conventional Cutlass bearing installation with the bearing of this invention.

FIG. 5 illustrates the bearing 14 on the shaft 16 in combination with a sleeve 62 spacing the bearing 14 from the propeller. The bearing 14 is keyed to the shaft 16 as in the embodiment of FIG. 1-2 and is thereby rotated with the shaft 16 and likewise prevented from shifting forward along the shaft 16. The spacer sleeve 62 is placed on the end of the shaft 16 and is sufficiently long to abut the propeller 18 and thereby prevent the bearing 14 from shifting rearwardly along the shaft 16. The spacer sleeve 62 preferably includes a relatively thick rearward section 64 and a relatively thin forward section 66 recessed to receive the exposed end 24 of the metal sleeve 20.

FIGS. 6 and 7 illustrate another embodiment of this invention used in a different application. In drilling wells into the earth, usually prospecting for oil or natural gas, a fairly recent development has been a motor 70, typically called a mud motor, powered by drilling fluid pumped down a drill string 72. Mud motors are typically used to drill deviated or horizontal holes in the earth. Conventional mud motors incorporate a plurality of standard Cutlass type bearings. Mud motors are expensive to build and maintain and are capable of running for continuous periods of less than several days, one reason being that the standard Cutlass bearings cannot take the abuse of normal mud motor operation.

As shown in FIG. 6, a typical mud motor 70 includes, as major components, a rotor 74, a stator 76, one or more universal joints 78, a bearing assembly 80 and a drive shaft 82 connected to a bit 84. As shown in FIG. 7, the drive shaft 82 includes a bit box 86 having coarse internal threads for receiving the bit 84 therein. A shaft 88 extends upwardly from the bit box 86 and provides a central passage 90 for delivering mud from the rotor-stator 74, 76 to the bit 84. The drive shaft 82 also provides an upwardly facing shoulder 92 near the junction of the shaft 88 and bit box 86 having a pair of upstanding lugs 94 projecting therefrom, external threads 96 intermediate the ends of the shaft 88 and external threads 98 at the upper end of the shaft 88, all for purposes more fully explained hereinafter.

The bearing assembly 80 is immediately above the shoulder 92 and acts to support the shaft 88 for rotation relative to an external housing 100 and to resist the load applied to the bit 84. As mentioned, a conventional mud motor uses conventional Cutlass bearings for this purpose. In lieu of conventional Cutlass bearings, one or more bearings 102 of this invention are provided. The bearing 102 is best illustrated in FIGS. 7 and 8 and comprises a central rigid, preferably metal, sleeve 104 having a pair of aligned puller openings 105 therein. The sleeve 104 has a rubber sleeve 106 bonded to the exterior thereof. A plurality of grooves 108 extend along the exterior of the sleeve 106, defining lands 109 therebetween, and direct mud or water around the bearing 102 to lubricate and cool it and flush out sand or silt. One end of the rigid sleeve 104 extends beyond the rubber sleeve 106. Means are provided for rotatably connecting the bearing 102 to the drive shaft 82. In the embodiment of FIG. 8, the rotatable connecting means comprises four notches 110 spaced apart 90° for receiving the lugs 94 as shown in FIG. 7. The notches 110 are cut through the metal sleeve 104 and through the rubber sleeve 106 at a location in the lands 109 to leave the grooves 108 unobstructed.

The bearing 102 is accordingly placed over the drive shaft 88 with the notches 110 down to engage the lugs 94. A nut 112 is advanced over the drive shaft 88 and threaded onto the external threads 96 to captivate the bearing 102 axially. A series of conventional ball bearing assemblies 114 are passed over the drive shaft 88 and are supported on the nut 112. Suitable means are provided above the ball bearing assemblies 114 to take the axial load applied to the bit 84. To this end, a load bearing donut 116 is placed around the shaft 88 and connected to the tubular housing 118 by transverse threaded fasteners 120 or the like.

One or more upper bearings 102 are passed over the shaft 88 to rest on the donut 116. Preferably, the upper bearing 102 is placed with the notch 110 up to receive a lug 122 on the exterior of a threaded connection 124 threaded onto the threads 98. The connection 124 connects the drive shaft 88 to the universal joint assembly 78 and also acts to connect the bearing 102 to the shaft 88 for rotation therewith.

Operation of the mud motor 70 should now be apparent. The bearings 102 are sized so the lugs 94, 122 are received in the notches 110 to rotate the bearings 102 with the shaft 88. Some axial play of the bearings 102 is allowed on the shaft 88 because of the spacing between the shoulder 92 and the bottom of the nut 112 in the case of the lower bearing 102 and because of the spacing between the donut 116 and the connection 124 in the case of the upper bearing 104. The axial load applied to the bit 84 is delivered through the drill string 72 and housing 118 to the donut 116 and then to the ball bearing assemblies 114, shaft 88 and bit box 86. When mud is pumped down the drill string 72, the rotor 74 is rotatably driven relative to the stator 76 to drive the universal joint assemblies 78 and thus the drive shaft 82. Most of the mud delivered to the rotor 74 is directed into the passage 90 and then to the bit 84 for cooling and lubricating the bit, carrying off drilled cuttings and the like. A minor portion of the mud delivered to the rotor 74 is diverted into the annulus around the shaft 88 to cool and/or lubricate the bearings 102 and the ball bearing assemblies 114. The rubber sleeves 106 of the bearings 102 are sized to react against the interior of the housing 118, or a wear sleeve therein, to journal the drive shaft 82 relative to the housing 118.

Referring to FIG. 9, another embodiment of the bearing 126 of this invention is illustrated. A rigid sleeve 128 provides a drive lug 130 on the end thereof. A rubber sleeve 132 is bonded on the exterior of the sleeve 128 and a series of grooves 134 extend therealong. In the embodiment of FIG. 9, the lugs 130 react with a notch or lug on the shaft associated therewith to transmit rotation of the shaft into rotation of the bearing 126.

Referring to FIG. 10, there is illustrated a marine application where the bearing 102 is in the process of being placed on a propeller drive shaft 136 on which has been welded a series of lugs 138 sized to fit in the notches 110. The bearing 102 is moved to the right in FIG. 10 to place the lugs 138 in the notches 110. The lugs 138 thus rotate the bearing 102 with the shaft 136 and control the extent the bearing 102 moves to the right in FIG. 10. Leftward movement of the bearing 102 in FIG. 10 is limited by the propeller hub as suggested in FIG. 4 or a sleeve as suggested in FIG. 5 to an amount less than the axial length of the lugs 138 thereby captivating the bearing 102 on the propeller shaft 136.

An important feature of this invention is the wear sleeve 44 and its cooperation with the various bearings of this invention. Although the sleeve 44 can be removed after removing the propeller shaft 16, 136 and the sleeve 45 can be removed without pulling the propeller shaft 16, it is much preferred to leave the sleeves 44, 45 alone when replacing one of the bearings. It will be appreciated that no wear occurs on the propeller shafts 16, 136 because all wear occurs on the bearings and the wear sleeves 44, 45. After one of the worn bearings is removed, the internal diameter of the wear sleeves 44, 45 is measured. Replacement bearings of this invention may preferentially be sold having an oversized external diameter but with the grooves already machined in. Such an oversized bearing is easily turned down at a machine shop to fit the partially worn wear sleeves 44, 45.

A trial installation has been made on a twin screw tow boat in accordance with FIG. 10. Both propeller shafts were removed from the vessel, built up and machined to be as identical as practicable. A new matched pair of propellers were purchased. One of the shafts was mounted in a conventional Cutlass bearing and the other in accordance with FIG. 10. Both installations were done in accordance with standard operating procedures and both propellers were satisfactorily tested, after installation, to determine if there was any gross eccentricity. After the tow boat was put back in the water and the engines started, the shaft mounted in the standard Cutlass bearing was humming slightly while the bearing of this invention was quiet.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. In combination, a housing having a passage therethrough providing an exposed end and an inaccessible end, a shaft extending through the passage having a first end exposed through the exposed passage end and a second end, and a bearing mounting the shaft for rotation relative to the housing including a first rigid sleeve surrounding the shaft having a notched end, means captivating the first sleeve to the shaft for rotation therewith including a radially extending member on the shaft meshing with the notched sleeve end, and a second annular sleeve of resilient rubber-like material around the first sleeve and affixed thereto having a plurality of parallel grooves providing lands therebetween.

2. The combination of claim 1 further comprising a third rigid sleeve, in the passage and affixed to the housing, receiving the second sleeve for rotation relative thereto.

3. The combination of claim 1 wherein the notched end is the second end of the first sleeve.

4. The combination of claim 3 wherein the notched end provides a cutout through the second sleeve intersecting a land.

5. The bearing of claim 1 wherein the notched end provides a reentrant.

6. The bearing of claim 1 wherein the notched end provides a lug.

7. A bearing for mounting a shaft for rotation relative to a housing including
   a rigid cylindrical sleeve having first and second ends for receiving and surrounding the shaft, and
   an annular cylindrical sleeve of resilient rubber-like material having first and second ends and surrounding the second sleeve and affixed thereto, the resilient sleeve having an external cylindrical surface providing a series of parallel external grooves providing lands therebetween, the grooves opening through the first and second ends of the resilient sleeve,
   the resilient sleeve first end and the rigid sleeve first end being coterminous,
   the rigid sleeve second end extending beyond the resilient sleeve second end to provide an exposed rigid sleeve section, and
   the first rigid sleeve providing at least one mating part of a lug-and-slot rotary drive.

8. The combination of claim 7 wherein the exposed rigid sleeve section providing at least one puller accessory.

9. The bearing of claim 8 wherein the exposed rigid sleeve section provides a transverse opening, the puller accessory comprising the transverse opening.

10. The bearing of claim 8 further comprising a second rigid cylindrical sleeve providing a smooth continuous internal surface of fixed diameter rotatably receiving the resilient sleeve in load transmitting relation.

11. The bearing of claim 8 wherein the mating part comprises a lug extending axially away from the rigid sleeve section parallel to the first rigid sleeve.

12. The bearing of claim 8 wherein the mating part comprises a slot extending axially into the rigid sleeve section.

13. The bearing of claim 8 wherein the mating part comprises a slot extending axially into the first rigid sleeve end, extending axially into the first resilient sleeve end and extending radially through one of the lands.

* * * * *